(12) United States Patent
Yim

(10) Patent No.: US 12,536,225 B2
(45) Date of Patent: Jan. 27, 2026

(54) QUERY REFINEMENT USING OPTICAL CHARACTER RECOGNITION

(71) Applicant: Google LLC, Mountain View, CA (US)

(72) Inventor: Keun Soo Yim, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/399,073

(22) Filed: Dec. 28, 2023

(65) Prior Publication Data

US 2025/0217412 A1 Jul. 3, 2025

(51) Int. Cl.
*G06F 16/583* (2019.01)
*G06F 16/532* (2019.01)
*G06F 16/538* (2019.01)
*G06V 30/146* (2022.01)

(52) U.S. Cl.
CPC ........ *G06F 16/5846* (2019.01); *G06F 16/532* (2019.01); *G06F 16/538* (2019.01); *G06V 30/147* (2022.01)

(58) Field of Classification Search
CPC .. G06F 16/5846; G06F 16/538; G06F 16/532; G06V 30/147
See application file for complete search history.

(56) References Cited

U.S. PATENT DOCUMENTS

| | | | | |
|---|---|---|---|---|
| 9,489,401 | B1* | 11/2016 | Garcia | G06F 16/5838 |
| 2011/0131235 | A1* | 6/2011 | Petrou | G06F 16/532 |
| | | | | 707/769 |
| 2012/0323560 | A1* | 12/2012 | Perez | G06F 40/289 |
| | | | | 704/9 |
| 2018/0032804 | A1* | 2/2018 | Yellapragada | G06F 16/58 |
| 2019/0012714 | A1* | 1/2019 | Bright | G06F 16/951 |
| 2022/0319212 | A1* | 10/2022 | Balakrishnan | G06F 16/3332 |

* cited by examiner

*Primary Examiner* — Kannan Shanmugasundaram

(74) *Attorney, Agent, or Firm* — DORITY & MANNING P.A.

(57) ABSTRACT

Aspects of the disclosed technology include formulating and processing image-based queries by generating a text fragment from an input image, determining a predicted system task based at least in part on the text fragment, obtaining search results for a query executed based at least in part on the text fragment, and in response to determining that the predicted system task is not fulfilled by the search results, generating a query refinement based at least in part on an association between the text fragment and one or more completed user queries. Display data for a search results page can be generated based at least in part on the query refinement.

20 Claims, 6 Drawing Sheets

QUERY REFINEMENT USING OPTICAL CHARACTER RECOGNITION

FIELD

The present disclosure relates generally to computer-based search and assistant systems and methods, and more particularly, to image-based query processing using optical character recognition processes.

BACKGROUND

Search and assistant platforms have become ubiquitous in modern computing environments. Users frequently access search and assistant interfaces to help understand the world around them. Today, multimodal search interfaces are readily available that enable users to provide text, image, audio, video, and other inputs as queries for processing by search and assistant platforms. Understanding a user's intent, or simply the information that is sought by a user in response to an input can be difficult, particularly where the input is not text-based. For instance, a search or assistant application may receive an input image that contains text with little or no other information to guide the application as to what information a user is seeking. Traditionally, optical character recognition is performed on an image and the recognized text is used as a text query to the system. Errors in recognized text and the lack of supplemental information accompanying the image can lead to less than optimal query formulations.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method performed by one or more processors. The method includes obtaining image data describing an image captured with a first computing device, generating, using at least one optical character recognition process, a text fragment from at least a portion of the image, determining at least one predicted system task based at least in part on the text fragment, obtaining search results for a first query executed based at least in part on the text fragment, determining that the at least one predicted system task is not fulfilled by the search results for the first query, in response to determining that the at least one predicted system task is not fulfilled by the search results for the first query, generating at least one query refinement based at least in part on an association between the text fragment and one or more completed user queries, and generating display data for a search results page based at least in part on the at least one query refinement.

Another example aspect of the present disclosure is directed to a system including one or more processors, and one or more computer-readable storage media that store instructions that, when executed by the one or more processors, cause the one or more processors to perform operations. The operations include obtaining image data describing an image captured with a first computing device, generating, using at least one optical character recognition process, a text fragment from at least a portion of the image, determining at least one predicted system task based at least in part on the text fragment, obtaining search results for a first query executed based at least in part on the text fragment, determining that the at least one predicted system task is not fulfilled by the search results for the first query, in response to determining that the at least one predicted system task is not fulfilled by the search results for the first query, generating at least one query refinement based at least in part on an association between the text fragment and one or more completed user queries, and generating display data for a search results page based at least in part on the at least one query refinement.

Another example aspect of the present disclosure is directed to one or more non-transitory computer-readable storage media that store instructions that, when executed by one or more processors, cause the one or more processors to perform operations. The operations include obtaining image data describing an image captured with a first computing device, generating, using at least one optical character recognition process, a text fragment from at least a portion of the image, determining at least one predicted system task based at least in part on the text fragment, obtaining search results for a first query executed based at least in part on the text fragment, determining that the at least one predicted system task is not fulfilled by the search results for the first query, in response to determining that the at least one predicted system task is not fulfilled by the search results for the first query, generating at least one query refinement based at least in part on an association between the text fragment and one or more completed user queries, and generating display data for a search results page based at least in part on the at least one query refinement.

Other example aspects of the present disclosure are directed to other systems, methods, apparatuses, tangible non-transitory computer-readable media, and devices for performing functions described herein. These and other features, aspects, and advantages of various implementations will become better understood with reference to the following description and appended claims. The accompanying drawings, which are incorporated in and constitute a part of this specification, illustrate implementations of the present disclosure and, together with the description, help explain the related principles.

DETAILED DESCRIPTION

Figure 1:
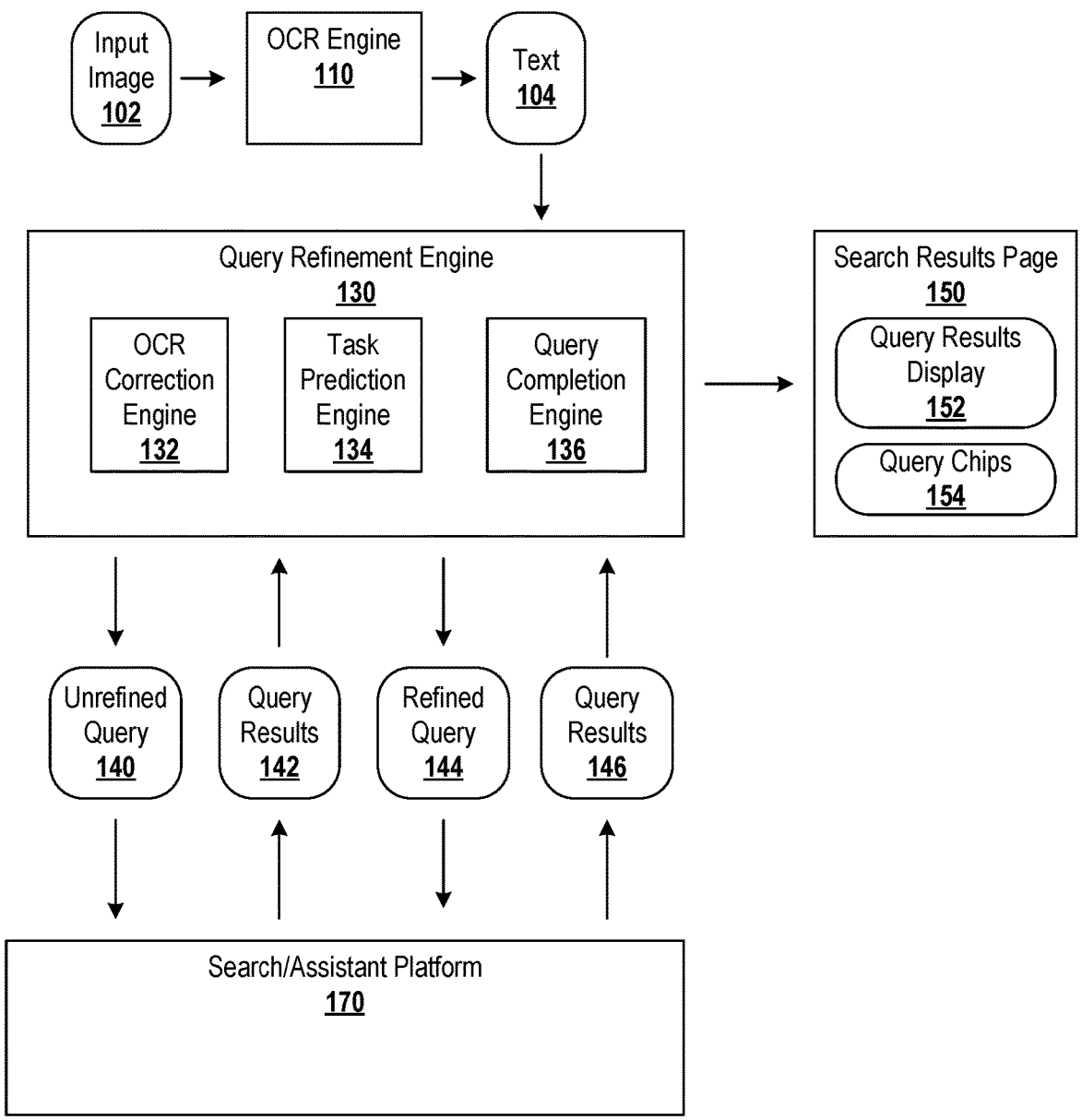
FIG. 1 is a block diagram depicting an example computing environment including a query refinement engine for processing image-based inputs according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to computer-implemented search and assistant technologies, and more particularly, to systems and methods for analyzing image-based queries to provide search results that are more relevant to user intent by utilizing error correction, query completion, and task prediction techniques in query formulation processing. According to example embodiments of the disclosed technology, images such as screenshots and camera images from computing devices (e.g., smartphone) are analyzed to detect text and generate refined user queries that are more representative of user intent associated with submission of the images to the system. For example, the system can perform optical character recognition (OCR) to identify text in an image and perform error correction to correct errors in the (OCR) process prior to submitting a query to a search and/or assistant platform. The system can also perform query completion to generate refined queries from the recognized text and task prediction to determine when search results fulfill user intent or task prediction.

Existing image-based search and assistant applications can process images to generate user queries including textual inputs based on text displayed in the images. These applications can perform optical character recognition (OCR) on image data to recognize text in an image and generate a text-based output, such as a text fragment including a plurality of characters. A user query including the text-based output can be formulated and submitted to a search platform which generates search results that are provided to the user.

Traditionally, search applications have used OCR to generate machine-encoded text which is used in its native state as the basis for a query. Text recognized from images is used without modification or consideration of other inputs such as contextualization information that may be available. For example, such text is often used in an innate state to generate queries, without consideration of native errors, intent, context, or other signals that may be available. In these existing systems, an image can be analyzed and recognized text used as a query input without preprocessing. These textual inputs may contain errors and lack refinements potentially available from processing other inputs. Moreover, traditional search improvements when enacted have relied on system-wide policies that are applied to all inputs. Errors in text recognition and naive query formulations based on recognized text alone can lead to query formulations that are not representative of user intent or a predicted system task for the search platform. Such queries and resulting search results can result in users reformulating queries, often through inputs such as additional text, image, audio, etc. to more accurately formulate the query for resubmission to the search/assistant platform. Further, applying search improvements to all inputs can lead to unnecessary processing for queries where refinements are not needed.

In accordance with example implementations of the disclosed technology, image-based queries from user computing devices can be analyzed to recognize text which can be corrected before formulating and submitting queries based on the recognized text. By correcting recognized text prior to query submission, the system can formulate queries that more accurately reflect the user intent with the initial query submission. In this manner, the reformulation of queries requiring resources of the user computing device and the processing of additional queries by the search system can be avoided. Query refinements, such as by query completion processing, can also be generated based on the recognized text to more accurately reflect the user intent for the image-based query. By generating query refinements, the system can further formulate queries that more accurately reflect the user intent, thereby avoiding query reformulation and associated processing. Additionally, task prediction can be utilized to conditionally generate query refinements when the system determines that a predicted task is not fulfilled by search results. By conditionally refining queries based on task prediction fulfillment, the system can efficiently use resources to generate refined queries only when needed to satisfy query intent.

According to an example implementation of the disclosed technology, a query processing system can receive a user query that includes image data, such as data representing a screenshot image or camera image from a mobile computing device. The system can perform optical character recognition (OCR) on at least a portion of the image to generate a text fragment having a sequence of characters. The system can perform error correction on the text fragment to identify and correct any errors in the text fragment generated by the OCR process. The system can perform query completion to generate one or more refined user queries from the text fragment. The system can generate a search results page that is based at least in part on a refined user query. For instance, the system can generate a search results page showing default search results for the text fragment and one or more user interface elements that depict the refined user query as a suggested query.

According to another example implementation of the disclosed technology, a query processing system can receive an image from a user computing device and perform optical character recognition to identify text in the image. The system can detect and correct errors in the identified text and generate a user query using the detected text. The text and/or other signals (e.g., image inputs, audio inputs, etc.) can further be analyzed to determine a predicted task associated with the image. By way of example, the language of the text relative to a local region can be used to predict a translation system task or the presence of certain keywords such as an airport code (e.g., SFO, LAX) may be used to predict a flight search system task. As another example, the detection of a price symbol (e.g., "$") may be used to predict that a product search system task related to an object detected in the image is desired.

If the system determines that the predicted task is fulfilled by search results from the user query, the system can generate a search results page with the search results for the user query. If the system determines that the predicted task is not fulfilled by the search results, however, it can generate a refined query using query completion on the recognized text. The query refinement can be based on an association between the text and completed user query (ies). The system can then generate a search results page based on the refined query. For example, the search results page can include the search results for the text and a user interface element for the refined query. In another example, the search results page can include the search results for the refined query and a user interface element for the submitted query.

Systems and methods in accordance with example embodiments of the present disclosure provide a number of technical effects and benefits. The systems and methods can include technologies for formulating queries based on image inputs and more particularly, technologies that provide error correction, query refinement, and task prediction to more accurately formulate queries from image-based inputs. Traditionally, queries have been formulated from image inputs using optical character recognition to recognize text which is used as a text-based query. Errors in text recognition and query formulations based on simple text recognition, however, often result in query reformulation and resubmission, which can require additional compute at both the device originating the query and the platform servicing the queries.

Embodiments of the disclosed technology include a query refinement engine which can apply error correction techniques to correct recognized text prior to query formulation, query refinement techniques to formulate completed queries from text fragments, and task prediction techniques to determine when query refinement should be performed. Static and/or dynamic error probabilities can be utilized to replace recognized characters when the likelihood of error exceeds a threshold. These techniques can be used prior to query formulation. In this manner, compute savings in bandwidth, processing, and power consumption can be achieved relative to traditional techniques that often require query reformulations and additional query processing. Query refinement can additionally be applied to recognized text to generate completed queries from simple text fragments. The formulation of queries using query completion results in query formulations that are more likely to satisfy a system task or user intent. As such, compute efficiencies are achieved by reducing query reformulations and processing. Query refinements in some examples are conditioned on task prediction analysis to avoid query refinement processing when it is not needed. A task prediction can be generated based on recognized text fragments and compared with initial query results based on the text fragment. If initial query results satisfy a predicted system task, the system can generate and provide query results without the processing associated with query refinements.

With reference now to the Figures, example embodiments of the resent disclosure will be discussed in further detail.

FIG. 1 is a block diagram depicting an example computing environment 100 in accordance with example embodiment of the present disclosure. Computing environment 100 includes an optical character recognition engine 110, query refinement engine 130, and search/assistant platform 170. Search/assistant platform 170 can include a search processing system and/or an assistant processing system that is configured to respond to user queries with query results. While reference is made to search/assistant platforms generally throughout the disclosure, it will be understood that the disclosed principles can be utilized with a search platform, assistant platform, or combined search/assistant platform. The components of computing environment 100 can be implemented by one or more computing devices, such as a combination of one or more client computing devices and/or one or more server computing devices. Example client and server computing device implementations are described hereinafter.

Optical character recognition engine 110 is configured to receive or otherwise obtain an input image 102 such as a screenshot or camera image from a mobile computing device. The input image 102 can be represented by image data that is received as part of a search or assistant query in example embodiments. For instance, a user may access one or more assistant, textual search, multi-modal search, or other applications to generate a user query including image data for image 102. The user query may include additional components such as textual inputs, audio inputs, and the like, in addition to image 102. Optical character recognition engine 110 performs one or more optical character recognition processes to identify text in input image 102. Optical character recognition engine 110 can recognize individual characters present in or more portions or area of the image 102. Optical character recognition engine 110 can generate one or more outputs including text 104 recognized in the image. Text 104 can include one or more text fragments in example embodiments.

Query refinement engine 130 is configured to receive or otherwise obtain the text 104 from OCR engine 110 and formulate one or more queries for the search/assistant platform 170. The search/assistant platform can generate query results to be presented to a user in a search results page 150. Query refinement engine 130 includes an OCR correction engine 132, task prediction engine 134, and query completion engine 136. It is noted that query refinement engine 130 may include additional components or fewer components than those depicted in example implementations. As will be discussed in more detail hereinafter, the individual components of query refinement engine 130 can vary by implementation.

OCR correction engine 132 is configured to access the text 104 generated by OCR engine 110 and correct any detected errors in the text output. OCR engine 110 can access a text fragment in text 104, identify errors in the text fragment, and generate a modified text fragment with the errors corrected. In example embodiments, OCR engine 110 can detect errors in individual characters within a text fragment. OCR engine 110 can utilize error probability data describing error probabilities for the characters to generate a modified text fragment when errors are detected.

According to an example implementation, OCR correction engine 132 can utilize an OCR error table including error probability data which describes the probability of a recognized character actually being another character. For instance, a static error probability table can be used. By way of example, the entry for the character "v" in a static error probability table may include [{0.5, "r"}, {0.3, "u"}] indicating a 50% probability that the detected "v" is actually an "r" and a 30% probability that the detected "v" is a "u." In another example, the OCR correction engine can utilize dynamic error probability by calculating error probabilities dynamically at runtime. Dynamic error probabilities can indicate the error probability of recognized characters based on user history, related or proximate characters, and other information available to the OCR correction engine at runtime. OCR correction engine 132 can be configured to replace a character from the text fragment with a character from the error table when an error probability satisfies a threshold or other replacement criteria. For example, OCR correction engine 132 can replace the "v" in the text fragment "vunning" to "r," to construct a modified text fragment "running."

Task prediction engine 134 is configured to determine one or more predicted tasks representative of user intent associated with a query or text fragment. Task prediction engine 134 can use the recognized text input, as well as other inputs such as the image data, audio inputs, sensor inputs and the like in the task prediction. The inputs can be explicit, implicit, or inferred. Task prediction engine 134 can receive or otherwise obtain a text fragment generated by OCR engine 110, or a modified text fragment generated by OCR correction engine 132. Task prediction engine 134 can analyze the original or modified text fragment to determine one or more predicted tasks. In some examples, task prediction engine 134 can analyze other inputs such as the image data (e.g., image recognition to detect objects), audio inputs (e.g., audio command input detection) that can be used in task prediction.

By way of example, task prediction engine 134 can detect the language of the text fragment and compare it to a default or other specified language for a region or location in which the user query originated. If the text is in a foreign language (i.e., is not in the default language for the region), the task prediction engine 134 can determine that the predicted task for the query is translation. As another example, the system can detect certain keywords, phrases, or other indications of intent associated with a query. For example, the system can detect the keyword "definition" in the text fragment or in an audio input to determine that the predicted task is to define another word included in the text fragment. As another example, the system can detect the presence of certain objects in an image and predict a system task related to the object such as product information search. Further, the system may detect an airport code and determine a flight search predicted system task. As yet another example, the system may detect music and determine a music search predicted system task.

According to example embodiments, task prediction engine 134 can utilize one or more machine-learned models such as a classification model, large-language model, or other model (e.g., sequence processing model) to generate a predicted task associated with a text fragment. Task prediction engine 134 can provide the text fragment to the machine-learned model which is configured to generate an output including a predicted task classification for the text fragment.

Query completion engine 136 is configured to generate one or more refined queries based on the text fragment generated by OCR engine 110 or the modified text fragment generated by OCR correction engine 132. Query completion engine 136 can receive or otherwise obtain the original or modified text fragment and perform query completion to generate one or more refined queries. By way of example, query completion engine 136 can compare the text fragment with a database of completed user queries to identify one more related queries that are used to generate a refined query from the text fragment. A "bag of words" model utilizing an unordered collection of words approach can be used to identify closely related queries based on multiplicity of words in an example implementation. In another example, a machine-learned query completion model can be used. For example, language sequence processing models can be used to generate one or more refined queries from an input text fragment. For instance, query completion engine 136 can pass the text fragment as a prompt input to a sequence processing model such as a large language model to request the generation of a refined query. In another example, a large language model can be fine-tuned using training data that includes input text fragments and refined query outputs.

Query refinement engine 130 can pass or otherwise transmit an unrefined query 140 to search/assistant platform 170 and receive query results 142. Unrefined query 140 can include the original text 104 generated by the OCR engine 110 in some examples. In other examples, unrefined query 140 can include the modified text generated by the OCR correction engine 132. In yet another example, a first unrefined query can be passed to the search/assistant platform 170 using the original text 104 and a second unrefined query can be passed to the search/assistant platform including the modified text. Search/assistant platform 170 generates query results 142 in response to the unrefined query or queries and generates query results 142 which are passed back to the query refinement engine 130.

In addition to or in place of the unrefined query 140, query refinement engine 130 can pass or otherwise transmit a refined query 144 to search/assistant platform 170 and receive query results 146. Refined query 144 can include one or more refined queries generated by query completion engine 136 in response to text 104 or a modified text fragment from OCR correction engine 132. One or more refined queries can be passed to the search/assistant platform. Search/assistant platform 170 generates query results 146 in response to the refined query which are passed back to the query refinement engine 130.

Query refinement engine 130 receives query results 142 and/or query results 146 and generates display data or other data for one or more search results pages 150. A search results page 150 can be generated based at least in part on one or more of the query refinements in example embodiments. In a first example, query refinement engine 130 can generate a search results page 150 including a query results display 152 for the query results 142 received in response to the unrefined query 140 passed to the search/assistant platform 170. In this example, search results page 150 can include one or more user interface elements such as query chips 154 that are associated with or otherwise correspond to the refined query 144. A query chip 154 can be presented for each refined query in example embodiments. The query refinement engine 130 can update or generate a new search results page 150 in response to user selection of the query chip 154. The updated page 150 can include a query results display 152 for the refined query results 146 and include one or more query chips 154 corresponding to the unrefined query 140. In a second example, query refinement engine 130 can generate an initial search result page that includes a query results display 152 for the query results received in response to one or more refined queries, and one or more user interface elements that are associated with or otherwise correspond to the unrefined query.

In accordance with example implementations, query refinement engine 130 can utilize the outputs of task prediction engine 134 to selectively generate refined queries and/or selectively generate search results pages with refined query results displays and refined query chips. In an example embodiment, query refinement engine 130 can compare the query results 142 for an unrefined query with the task prediction generated from the text fragment. The query refinement engine 130 can determine whether or not the query results 142 fulfill the predicted task from the task prediction engine 134. For example, the query refinement engine can determine if the query results satisfy one or more fulfillment criteria, such as by meeting or exceeding a fulfillment threshold. If the query results 142 fulfill the predicted task generated by task prediction engine 134, query refinement engine 130 can generate a search results page including a results display 152 for query results 142. Query refinement engine 130 can generate the search results page without generating refined queries or issuing refined queries to the search/assistant platform 170. In such a case, search results page 150 may not include any user interface elements such as query chips 154 for refined queries.

If query refinement engine 130 determines that query results 142 do not fulfill the predicted task from task prediction engine 134, query refinement engine 130 can generate one or more refined queries 144 using query completion engine 136 and receive query results 146 from search/assistant platform 170. Query refinement engine 130 can generate a search results page 150 based at least in part on the refined queries 144. For example, a search result page 150 can be generated that includes a results display 152 for the query results 142 from the unrefined query 140 and one or more query chips 154 for the one or more refined queries. The query chips 154 can be presented as follow-on query suggestions to assist in fulling the predicted task. In another example, search results page 150 can include a results display 152 for the refined query results 146 and one or more query chips 154 for the unrefined query.

Figure 2:
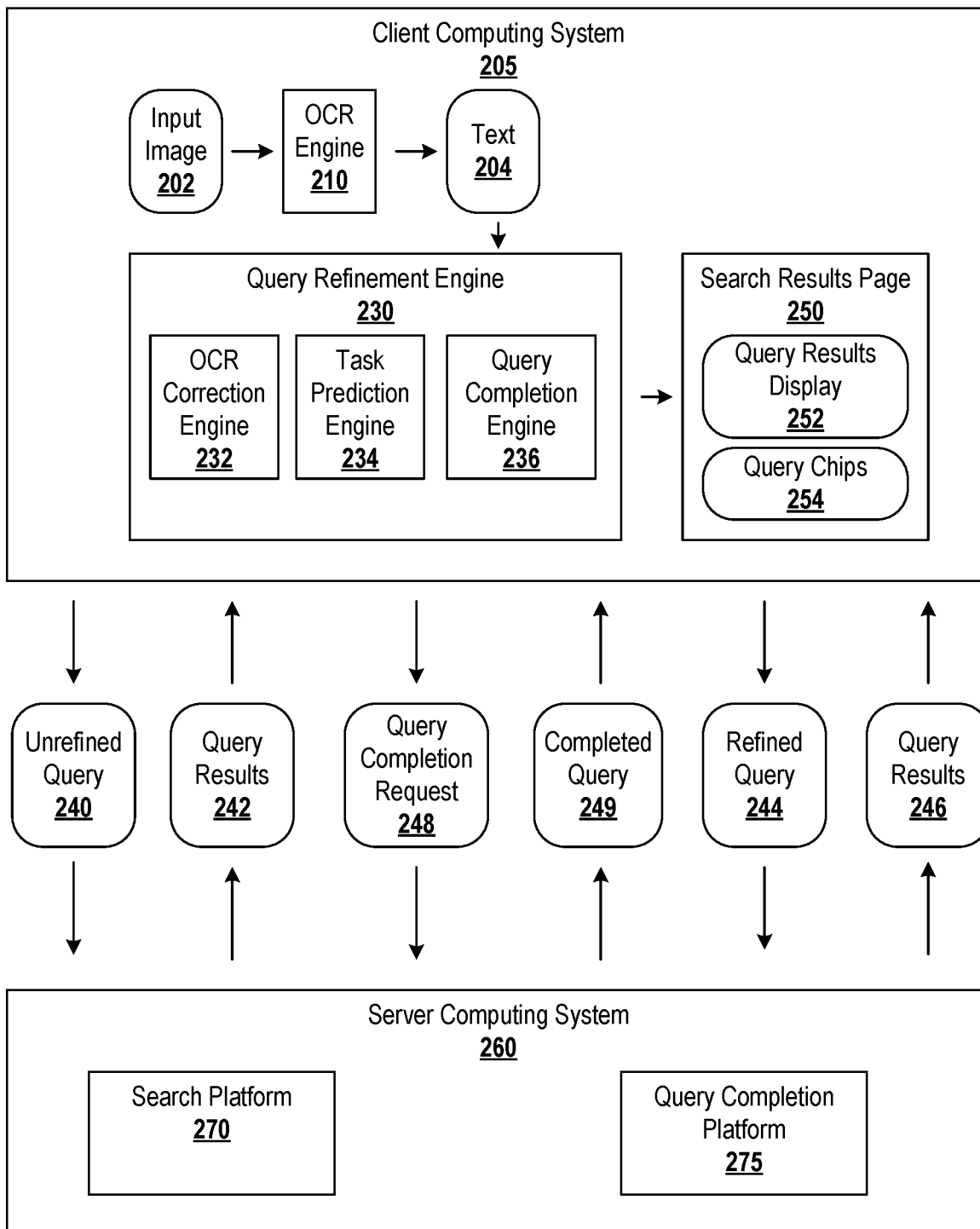
FIG. 2 is a block diagram depicting an example computing environment and data flow for formulating queries from image-based inputs according to example embodiments of the present disclosure.

FIG. 2 is a block diagram depicting an example computing environment 200 and data processing flow in accordance with example embodiments of the present disclosure. Computing environment 200 includes a client computing system 205 and a server computing system 260. Server computing system 260 implements a search/assistant platform 270 and query completion platform 275. Search/assistant platform 270 is one example of search/assistant platform 170 depicted in FIG. 1. Computing environment 200 may include any number of client computing system 205. In some examples, server computing system 260 may be implemented by a first computing system and each of the client computing systems 205 can be implemented by different remote computing systems. For instance, computing environment 200 may be implemented as a client server computing environment, including one or more client computing systems 205 implementing downstream applications (not shown) such as a client-side search and/or assistant application that accesses server computing system 260. In another example, server system 260 can be accessed by one or more remote server systems in addition to or in place of client computing systems 205.

The computing systems implementing server system 260 and client computing systems 205 can be connected by and communicate through one or more networks (not shown). Any number of client computing devices and/or server computing devices can be included in the client-server environment and communicate over a network. The network can be any type of communications network, such as a local area network (e.g., intranet), wide area network (e.g., Internet), or some combination thereof. In general, communication between the computing devices can be carried via a network interface using any type of wired and/or wireless connection, using a variety of communication protocols (e.g., TCP/IP, HTTP, RTP, RTCP, etc.), encodings or formats (e.g., HTML, XML, etc.), and/or protection schemes (e.g., VPN, secure HTTP, SSL, etc.).

In some example embodiments, a client computing device implementing a downstream search/assistant or other application can be any suitable device, including, but not limited to, a smartphone, a tablet, a laptop, a desktop computer, or any other computer device that is configured such that it can allow a user to access remote computing devices over a network. The client computing devices can include one or more processor(s), memory, and a display as described in more detail hereinafter. The client computing devices can execute one or more client applications such as a multimodal search or assistant application, web browser, email application, chat application, video conferencing application, word processing application or the like. Applications can access the server computing system 260 by passing user queries or other inputs to the server system 260 for processing by the search/assistant platform 270 and/or query completion platform 275.

The server computing system 260 can include one or more processor(s) and memory. The server computing system can be in communication with the one or more client computing device(s) using a network communication device that is not pictured.

It will be appreciated that the term "system" can refer to specialized hardware, computer logic that executes on a more general processor, or some combination thereof. Thus, a system can be implemented in hardware, application specific circuits, firmware, and/or software controlling a general-purpose processor. In one embodiment, the systems can be implemented as program code files stored on a storage device, loaded into memory and executed by a processor or can be provided from computer program products, for example computer executable instructions, that are stored in a tangible computer-readable storage medium such as RAM, hard disk, or optical or magnetic media.

In FIG. 2, client computing system 205 implements an optical character recognition (OCR) engine 210 and query refinement engine 230, including OCR correction engine 232, task prediction engine 234, and query completion engine 236. OCR engine 210, query refinement engine 230, OCR correction engine 232, task prediction engine 234, and query completion engine 236 are example implementations of OCR engine 110, query refinement engine 130, OCR correction engine 132, task prediction engine 134, and query completion engine 136 in FIG. 1.

OCR engine 210 receives an input image 202 and generates an output including text 204 from one or more portions of the input image 202 depicting text. Text 204 can be a machine-encoded text output. In example embodiments, input image 202 can include image data describing an image captured by one or more image capture devices of client computing system 205 or a screenshot image depicting at least a portion of an on-screen display. Input image 202 can be received with or as part of an input query which can additionally include text data, other image data, audio data, latent encoding data, and other input data. In some examples, the input image can be received as part of a multimodal query which may include multimodal data including combinations of the aforementioned data. Output text 204 can include one or more text fragments including recognized characters from one or more OCR processes performed by OCR engine 210.

Text 204 is passed to query refinement engine 230 which utilizes error correction engine 232 to correct any errors in the text fragments of the output text. If necessary, OCR correction engine 232 can generate one or more modified text fragments by replacing character(s) in the text 204. Query refinement engine 230 can generate an unrefined query 240 that includes the one or more text fragments generated by OCR correction engine 232. In another embodiment, query refinement engine 230 can generate an unrefined query 240 that includes the original text fragment(s) from the output text 204 of the OCR engine 210. Query refinement engine 230 passes or otherwise transmits the unrefined query 240 to sever computing system 260 and search/assistant platform 270. Search/assistant platform 270 generates one or more query results 242 in response to unrefined query 240 and passes the results back to client computing system 205.

Task prediction engine 234 can generate one or more predicted tasks associated with the unrefined query 240. For example, task prediction engine 234 can generate a predicted task using the text fragment(s) in text 204 and/or the modified text fragment(s) generated by OCR correction engine 232. Task prediction engine 234 can perform one or more natural language processes to identity one or more predicted tasks from the text fragment(s). Task prediction engine 234 can pass the text fragment(s) to one or more machine-learned models such as a large language model or other sequence processing model configured to generate a predicted task output in response to an input. In an example embodiment, the task prediction can be based on vector embeddings of the text fragments which are utilized by a sequence processing model to generate one or more task predictions.

Query refinement engine 230 can compare the query results 242 for an unrefined query with the task prediction generated from the text fragment(s). The query refinement engine 230 can determine if the query results 242 fulfill the predicted task from the task prediction engine 134. If the query results 242 fulfill the predicted task from the task prediction engine 234, query refinement engine 230 can generate a search results page including a results display 252 for query results 242. Search results page 250 can be generated without generating refined queries or issuing refined queries to the search/assistant platform. Search results page 250 may not include any user interface elements such as query chips 254 for refined queries in such cases.

If query refinement engine 230 determines that query results 242 do not fulfill the predicted task from task prediction engine 234, query completion engine generates one or more refined queries 244. In this example, server computing system implements a query completion platform 275. Query completion engine 236 can pass a query completion request 248 to query completion platform 275 at server computing system 260. The query completion request can include one or more text fragments generated by OCR engine 210 and/or a modified text fragments generated by OCR correction engine 232. Query completion platform 275 can receive the original or modified text fragment and perform query completion to generate one or more completed queries 249. By way of example, query completion platform 275 can compare the text fragment with a database of completed queries to identify one more related queries that are used to generate a completed query from the text fragment. Query completion platform 275 can utilize a sequence processing model such as a large language model to generate one or more completed queries 249.

Query completion engine 236 can receive the completed query 249 from query completion platform and generate a refined query 244 from the completed query 249 received from the query completion platform 275. In an example embodiment, the refined query 244 can be the same as the completed query 249 received from the query completion platform 275. In another example embodiment, the refined query 244 can be based on the completed query 249 and include modified or additional data. Query refinement engine 230 can pass the refined query 244 to search/assistant platform 270 and receive query results 246. In an alternative embodiment, query completion platform 275 can generate and directly pass a refined query to search/assistant platform 270 which can return search results to client computing system 205 directly or first to query completion platform 275 which can pass the results to client computing system 205.

Query refinement engine 230 receives query results 242 and/or query results 246 and generates one or more search results pages 250. Search results page 250 can include a query results display 252 for the query results 242 received in response to the unrefined query 240 and one or more query chips 254 that are associated with or otherwise correspond to the refined query 244. In another example, query refinement engine 230 can generate an initial search result page that includes a query results display 252 for the query results 246 received in response to the refined query, and one or more query chips 254 associated with or otherwise corresponding to the unrefined query.

Figure 3:
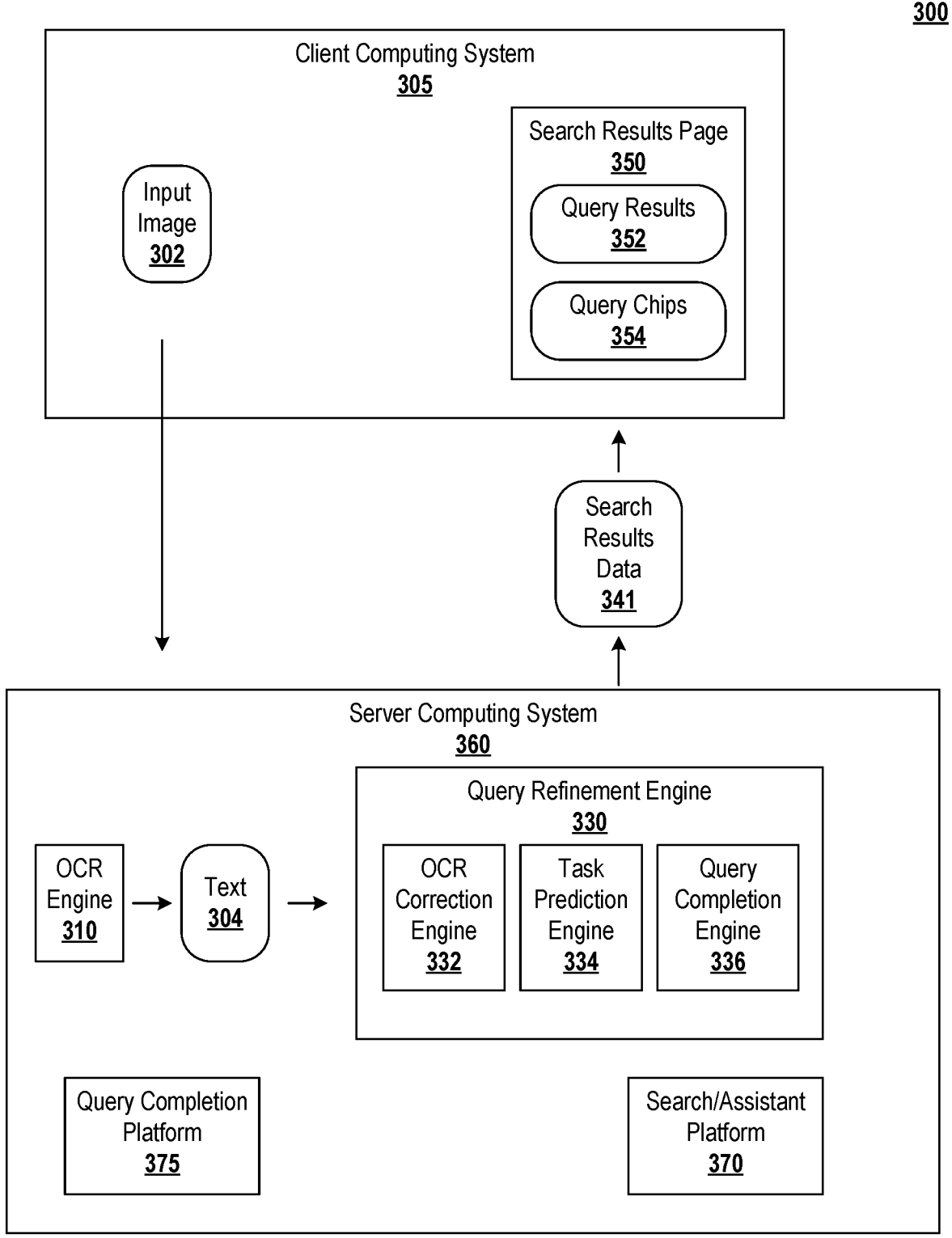
FIG. 3 is a block diagram depicting an example computing environment and data flow for formulating queries from image-based inputs according to example embodiments of the present disclosure.

FIG. 3 is a block diagram depicting an example computing environment 300 and data processing flow in accordance with example embodiments of the present disclosure. Computing environment 300 includes a client computing system 305 and a server computing system 360 that implements a search/assistant platform 370 and query completion platform 375. Search/assistant platform 370 is one example of search/assistant platform 170 and 270 depicted in FIG. 1 and FIG. 2, and query completion platform 375 is one example of query completion platform 275 depicted in FIG. 3.

In example computing environment of FIG. 3, client computing system f305 receives an input image 302 and passes the input image 302 directly to server computing system 360. Input image 302 can be passed with or as part of an input query which can additionally include text data, other image data, audio data, latent encoding, and multimodal data including combinations of the aforementioned data.

Server computing system implements an optical character recognition (OCR) engine 310 and query refinement engine 330, including OCR correction engine 332, task prediction engine 334, and query completion engine 336. OCR engine 310, query refinement engine 330, OCR correction engine 332, task prediction engine 334, and query completion engine 336 are example implementations of OCR engine 110, query refinement engine 130, OCR correction engine 132, task prediction engine 134, and query completion engine 136 in FIG. 1.

OCR engine 310 receives an input image 302 and generates an output including text 304 from one or more portions of the input image 302 depicting text. Text 304 is passed to error correction engine 332 to correct any errors in the text fragments of the output text 304. Query refinement engine 330 can generate an unrefined query which it passes directly to search/assistant platform 370. Search/assistant platform 370 generates one or more query results in response to the unrefined query and passes the results to query refinement engine 330.

Task prediction engine 334 can generate one or more predicted tasks associated with the unrefined query 340. The query refinement engine 330 can determine if the query results fulfill the predicted task from the task prediction engine 334. If the query results fulfill the predicted task from the task prediction engine 334, query refinement engine 330 can generate a search results page 350 including a results display 352 for the query results 242. Search results data 341 can be provided to client computing system 305 which can render a display of the search results page 350. If query refinement engine 330 determines that query results do not fulfill the predicted task from task prediction engine 334, query completion engine 336 can generate one or more refined queries. Query completion engine 236 can pass a query completion request to query completion platform 375. Query completion platform 375 can perform query completion to generate one or more completed queries. Query completion platform can pass the completed query to search/assistant platform 370 which generates query results. Search/assistant platform 370 can pass the query results to query refinement engine 230.

Query refinement engine 230 receives query results and generates one or more search results pages 350. Search results page 350 can include a query results display 352 for the query results received in response to the unrefined query and one or more query chips 354 that are associated with or otherwise correspond to the refined query. In another example, query refinement engine 330 can generate an initial search result page that includes a query results display 352 for the query results received in response to the refined query, and one or more query chips 354 associated with or otherwise corresponding to the unrefined query.

In an example embodiment, query refinement engine 330 can be implemented as part of the query completion platform. In this manner, the query completion platform can perform error correction, query refinement, and task prediction locally to optimize performance in some examples.

Figure 4:
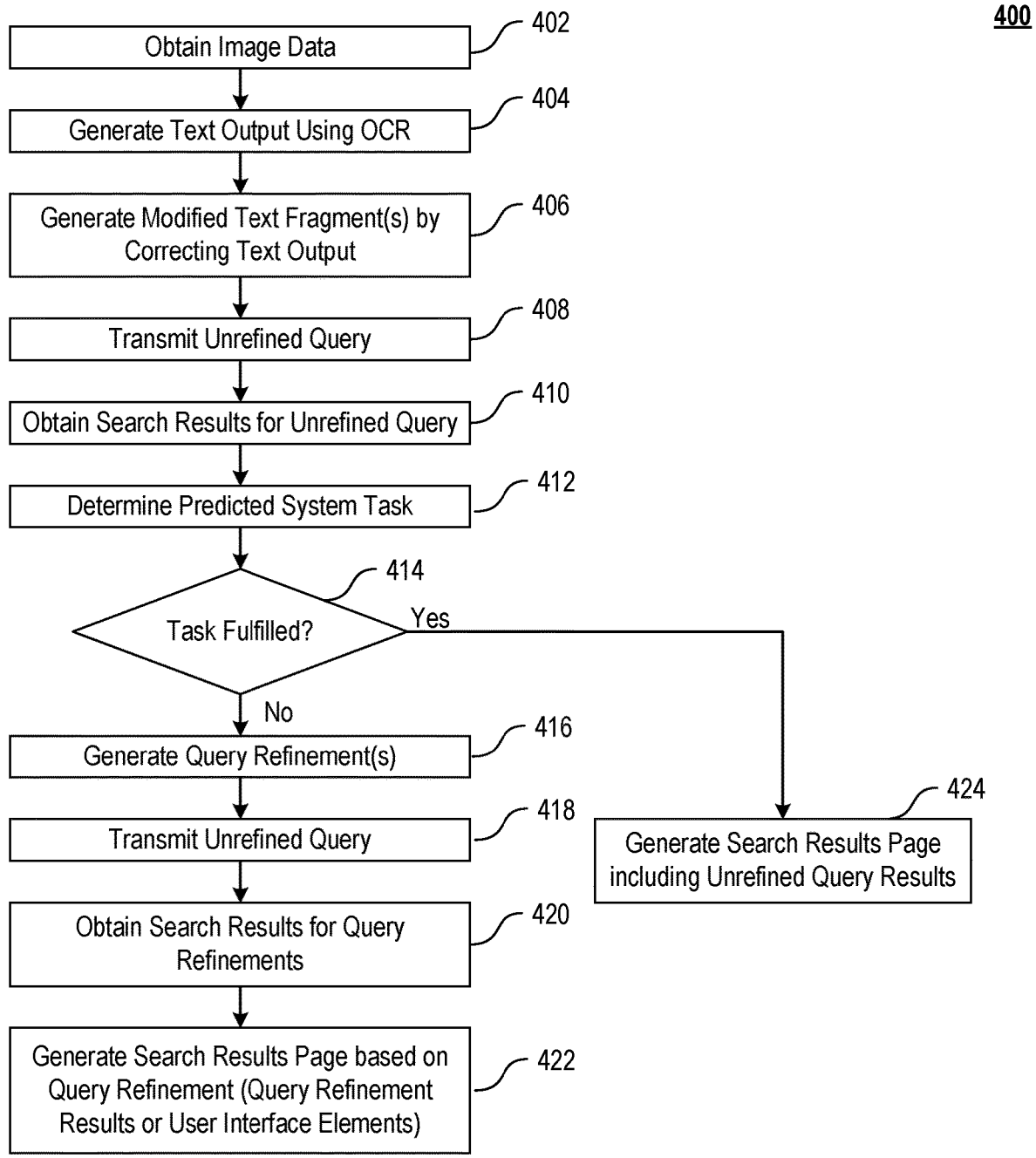
FIG. 4 is a flowchart diagram depicting an example method of formulating queries from image-based inputs according to example embodiments of the present disclosure.

FIG. 4 is a flowchart diagram depicting an example method 400 for query processing by a system utilizing OCR correction, task prediction, and query refinement to generate search results according to example embodiments of the present disclosure. One or more portion(s) of example method 400 and the other methods described herein can be implemented by a computing system that includes one or more computing devices, such as, for example, computing systems described with reference to FIG. 1, FIG. 2, and FIG. 3. By way of example, one or more portions of example method 400 can be performed by a query refinement engine (e.g., query refinement engine 130, 230, or 330). Each respective portion of the example methods can be performed by any (or any combination) of one or more computing devices. Moreover, one or more portion(s) of the example method 400 can be implemented on the hardware components of the device(s) described herein, for example, to generate search results in response to user queries. The methods in the figures may depict elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. The example methods are described with reference to elements/terms described with respect to other systems and figures for exemplary illustrated purposes and are not meant to be limiting. One or more portions of the example methods can be performed additionally, or alternatively, by other systems.

At 402, method 400 can include obtaining an input image. The input image can be received as image data and can be received with or as part of a user query generated by a client computing device. The user query can additionally include text data, audio data, video data, other image data, multimodal data, and various combinations thereof.

At 404, method 400 can include generating a machine-encoded text output by performing optical character recognition (OCR) on at least a portion of the image data. One or more OCR processes can be performed to generate the text output. The text output can include one or more text fragments including a plurality of characters. The OCR process can recognize individual characters present in or more portions or area of the image represented by image data and generate a text output.

At 406, method 400 can include generating one or more modified text fragments by correcting any errors detected in the text fragments of the text output from the OCR process. A static error probability table or dynamically calculated error probabilities can be used to determine whether a character in the text fragment should be replaced. For example, if an error probability for a character is above a predetermined threshold, the system can replace the character with an alternate character having a highest probability of being the correct character.

At 408, method 400 can include transmitting one or more unrefined queries to a search and/or assistant platform. An unrefined query can include the text fragment(s) generated by the OCR process and/or the modified text fragment(s) generated by the OCR correction process.

At 410, method 400 can include obtaining search results in response to the unrefined query. The search/assistant platform can generate query results in response to the unrefined query or queries and pass the results to the query refinement engine.

At 412, method 400 can include determining a predicted system task associated with the input image. The predicted system task can be based on the text fragment(s) generated by the OCR process and/or the modified text fragment(s) generated by the OCR correction process. A task prediction engine can analyze one or more text fragments to determine one or more predicted tasks. Word language, keywords, phrases, or other indications of intent can be used to determine a predicted task associated with a query. A machine-learned model such as a classification model, large-language model, or other model can be used to generate a predicted task associated with a text fragment. A model can be trained with training data including text fragments that have been annotated to indicated a predicted task associated with the text fragment.

At 414, method 400 can include determining whether the predicted system task is fulfilled by the search results obtained in response to the unrefined query. In an example embodiment, the query results for an unrefined query can be compared with the task prediction generated from the text fragment to determine whether the query results fulfill the predicted task (e.g., from the task prediction engine). The results can be determined to fulfill the predicted task if one or more fulfillment criteria are satisfied.

If the predicted system task is fulfilled by the search results, method 400 can proceed to 424. At 424, method 400 can include generating one or more search results pages including the unrefined query results. At 416, a search results page can be generated without generating any query refinements from the input image. In this manner, the system can forego additional processing to refine the input query in response to determining that the predicted system task has been fulfilled.

If the predicted system task is not fulfilled by the search results, method 400 can proceed to 416. At 416, method 400 can include generating one or more query refinements based on the text fragment(s) generated by the OCR process and/or the modified text fragment(s) generated by the OCR correction process. A query refinement can include a completed query generated by one or more query completion processes. In an example embodiment, the text fragment can be compared with a database of completed queries to identify one more related queries that are used to generate a completed query from the text fragment. In another example, a sequence processing model such as a large language model can be used to generate one or more completed queries from a text fragment.

At 418, method 400 can include transmitting one or more refined queries to the search and/or assistant platform. A refined query can include a completed query generated by one or more query completion processes.

At 420, method 400 can include obtaining search results in response to the refined query.

At 422, method 400 can include generating one or more search results pages based on the query refinement. In one example, the search results page can include a display or other output of the search results received for the unrefined query. The search results page can include one or more user interface elements corresponding to the refined query. The system can detect a section of the one or more user interface elements and update or generate a new search results page including the search results received for the refined query. In another example, the search results page can include a display or other output of the search results received for the refined query. The search results page can include one or more user interface elements corresponding to the unrefined query. The system can detect a selection of the one or more user interface elements and update or generate a new search results page including the search results received for the unrefined query.

Figure 5A:
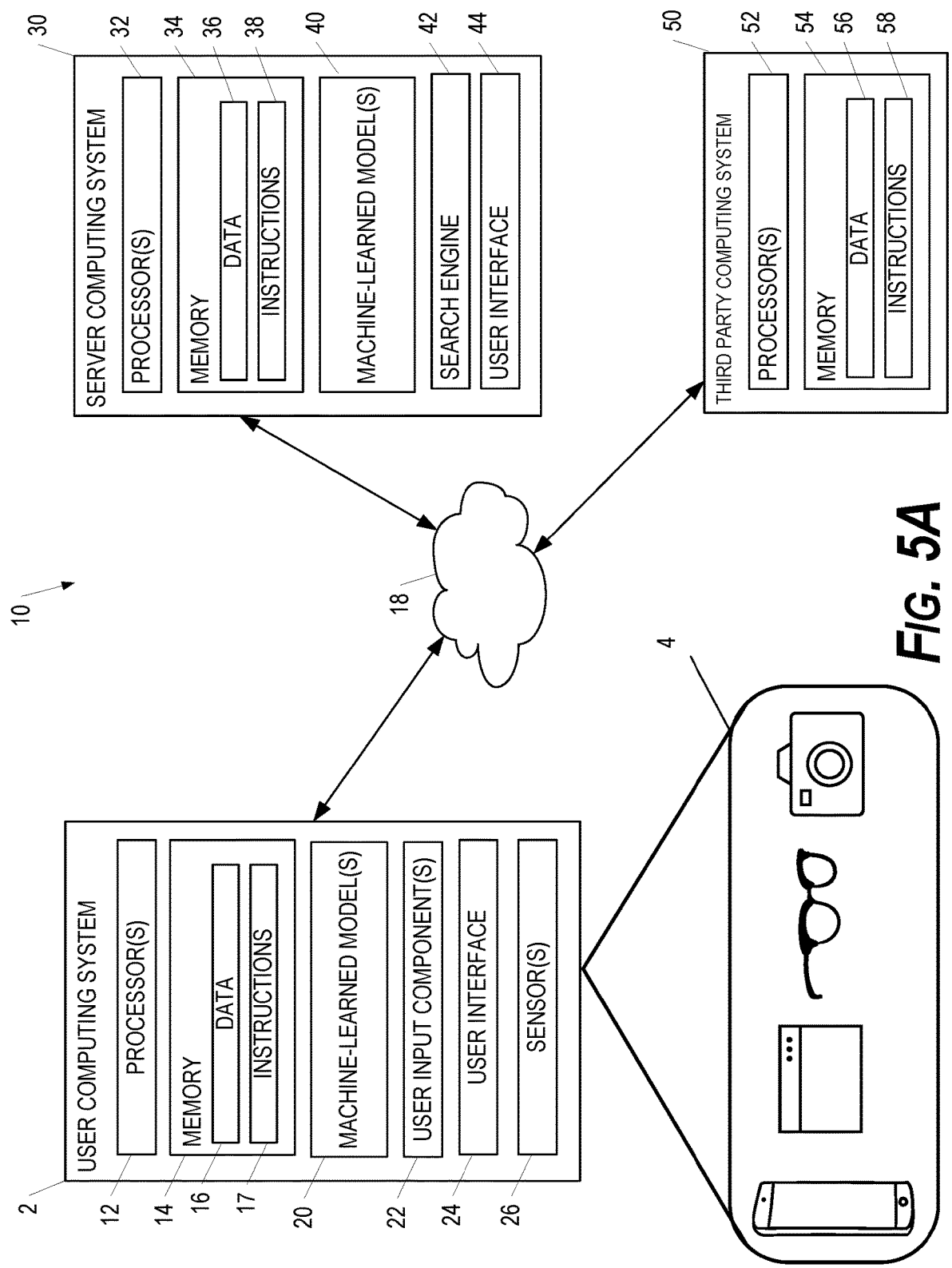
FIG. 5A is a block diagram depicting an example computing system that performs query refinement processing for image-based queries according to example embodiments of the present disclosure.

FIG. 5A is a block diagram depicting an example computing system that performs query refinement processing for image-based queries according to example embodiments of the present disclosure. The system 10 includes a user computing system 2, a server computing system 30, and/or a third computing system 50 that are communicatively coupled over a network 18.

The user computing system 2 can include any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 2 includes one or more processors 12 and a memory 14. The one or more processors 12 can be any suitable processing device (e.g., a processor core, a microprocessor, an ASIC, a FPGA, a controller, a microcontroller, etc.) and can be one processor or a plurality of processors that are operatively connected. The memory 14 can include one or more non-transitory computer-readable storage mediums, such as RAM, ROM, EEPROM, EPROM, flash memory devices, magnetic disks, etc., and combinations thereof. The memory 14 can store data 16 and instructions 17 which are executed by the processor 12 to cause the user computing system 2 to perform operations.

In some implementations, the user computing system 2 can store or include one or more machine-learned models 20. For example, the machine-learned models 20 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 20 can be received from the server computing system 30 over network 18, stored in the user computing device memory 14, and then used or otherwise implemented by the one or more processors 12. In some implementations, the user computing system 2 can implement multiple parallel instances of a single machine-learned model 20 (e.g., to perform parallel machine-learned model processing across multiple instances of input data and/or detected features).

More particularly, the one or more machine-learned models 20 may include one or more detection models, one or more classification models, one or more segmentation models, one or more augmentation models, one or more generative models, one or more natural language processing models, one or more optical character recognition models, and/or one or more other machine-learned models. The one or more machine-learned models 20 can include one or more transformer models. The one or more machine-learned models 20 may include one or more neural radiance field models, one or more diffusion models, and/or one or more autoregressive language models.

The one or more machine-learned models 20 may be utilized to detect one or more object features. The detected object features may be classified and/or embedded. The classification and/or the embedding may then be utilized to perform a search to determine one or more search results. Alternatively and/or additionally, the one or more detected features may be utilized to determine an indicator (e.g., a user interface element that indicates a detected feature) is to be provided to indicate a feature has been detected. The user may then select the indicator to cause a feature classification, embedding, and/or search to be performed. In some implementations, the classification, the embedding, and/or the searching can be performed before the indicator is selected.

In some implementations, the one or more machine-learned models 20 can process image data, text data, audio data, and/or latent encoding data to generate output data that can include image data, text data, audio data, and/or latent encoding data. The one or more machine-learned models 20 may perform optical character recognition, natural language processing, image classification, object classification, text classification, audio classification, context determination, action prediction, image correction, image augmentation, text augmentation, sentiment analysis, object detection, error detection, inpainting, video stabilization, audio correction, audio augmentation, and/or data segmentation (e.g., mask based segmentation).

Additionally or alternatively, one or more machine-learned models 40 can be included in or otherwise stored and implemented by the server computing system 30 that communicates with the user computing system 2 according to a client-server relationship. For example, the machine-learned models 40 can be implemented by the server computing system 30 as a portion of a web service (e.g., a viewfinder service, a visual search service, an image processing service, an ambient computing service, and/or an overlay application service). Thus, one or more models 20 can be stored and implemented at the user computing system 2 and/or one or more models 40 can be stored and implemented at the server computing system 30.

The user computing system 2 can also include one or more user input components 22 that receive user input. For example, the user input component 22 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the user computing system can store and/or provide one or more user interfaces 24, which may be associated with one or more applications. The one or more user interfaces 24 can be configured to receive inputs and/or provide data for display (e.g., image data, text data, audio data, one or more user interface elements, an augmented-reality experience, a virtual reality experience, and/or other data for display). The user interfaces 24 may be associated with one or more other computing systems (e.g., server computing system 30 and/or third party computing system 50). The user interfaces 24 can include a viewfinder interface, a search interface, a generative model interface, a social media interface, and/or a media content gallery interface.

The user computing system 2 may include and/or receive data from one or more sensors 26. The one or more sensors 26 may be housed in a housing component that houses the one or more processors 12, the memory 14, and/or one or more hardware components, which may store, and/or cause to perform, one or more software packets. The one or more sensors 26 can include one or more image sensors (e.g., a camera), one or more lidar sensors, one or more audio sensors (e.g., a microphone), one or more inertial sensors (e.g., inertial measurement unit), one or more biological sensors (e.g., a heart rate sensor, a pulse sensor, a retinal sensor, and/or a fingerprint sensor), one or more infrared sensors, one or more location sensors (e.g., GPS), one or more touch sensors (e.g., a conductive touch sensor and/or a mechanical touch sensor), and/or one or more other sensors. The one or more sensors can be utilized to obtain data associated with a user's environment (e.g., an image of a user's environment, a recording of the environment, and/or the location of the user).

The user computing system 2 may include, and/or pe part of, a user computing device 4. The user computing device 4 may include a mobile computing device (e.g., a smartphone or tablet), a desktop computer, a laptop computer, a smart wearable, and/or a smart appliance. Additionally and/or alternatively, the user computing system may obtain from, and/or generate data with, the one or more one or more user computing devices 4. For example, a camera of a smartphone may be utilized to capture image data descriptive of the environment, and/or an overlay application of the user computing device 4 can be utilized to track and/or process the data being provided to the user. Similarly, one or more sensors associated with a smart wearable may be utilized to obtain data about a user and/or about a user's environment (e.g., image data can be obtained with a camera housed in a user's smart glasses). Additionally and/or alternatively, the data may be obtained and uploaded from other user devices that may be specialized for data obtainment or generation.

The server computing system 30 includes one or more processors 32 and a memory 34. The one or more processors 32 can be any suitable processing device (e.g., a processor core, a microprocessor, an ASIC, a FPGA, a controller, a microcontroller, etc.) and can be one processor or a plurality of processors that are operatively connected. The memory 34 can include one or more non-transitory computer-readable storage mediums, such as RAM, ROM, EEPROM, EPROM, flash memory devices, magnetic disks, etc., and combinations thereof. The memory 34 can store data 36 and instructions 38 which are executed by the processor 32 to cause the server computing system 30 to perform operations.

In some implementations, the server computing system 30 includes or is otherwise implemented by one or more server computing devices. In instances in which the server computing system 30 includes plural server computing devices, such server computing devices can operate according to sequential computing architectures, parallel computing architectures, or some combination thereof.

As described above, the server computing system 30 can store or otherwise include one or more machine-learned models 40. For example, the models 40 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 40 are discussed with reference to FIG. 5B.

Additionally and/or alternatively, the server computing system 30 can include and/or be communicatively connected with a search engine 42 that may be utilized to crawl one or more databases (and/or resources). A search/assistant platform 170, 270, or 370 as may include a search engine in example embodiments. The search engine 42 can process data from the user computing system 2, the server computing system 30, and/or the third party computing system 50 to determine one or more search results associated with the input data. The search engine 42 may perform term based search, label based search, Boolean based searches, image search, embedding based search (e.g., nearest neighbor search), multimodal search, and/or one or more other search techniques.

The server computing system 30 may store and/or provide one or more user interfaces 44 for obtaining input data and/or providing output data to one or more users. The one or more user interfaces 44 can include one or more user interface elements, which may include input fields, navigation tools, content chips, selectable tiles, widgets, data display carousels, dynamic animation, informational pop-ups, image augmentations, text-to-speech, speech-to-text, augmented-reality, virtual-reality, feedback loops, and/or other interface elements.

The user computing system 2 and/or the server computing system 30 can train the models 20 and/or 40 via interaction with the third party computing system 50 that is communicatively coupled over the network 18. The third party computing system 50 can be separate from the server computing system 30 or can be a portion of the server computing system 30. Alternatively and/or additionally, the third party computing system 50 may be associated with one or more web resources, one or more web platforms, one or more other users, and/or one or more contexts.

The third party computing system 50 can include one or more processors 52 and a memory 54. The one or more processors 52 can be any suitable processing device (e.g., a processor core, a microprocessor, an ASIC, a FPGA, a controller, a microcontroller, etc.) and can be one processor or a plurality of processors that are operatively connected. The memory 54 can include one or more non-transitory computer-readable storage mediums, such as RAM, ROM, EEPROM, EPROM, flash memory devices, magnetic disks, etc., and combinations thereof. The memory 54 can store data 56 and instructions 58 which are executed by the processor 52 to cause the third party computing system 50 to perform operations. In some implementations, the third party computing system 50 includes or is otherwise implemented by one or more server computing devices.

The network 18 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data.

The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

The user computing system may include a number of applications (e.g., applications 1 through N). Each application may include its own respective machine learning library and machine-learned model(s). For example, each application can include a machine-learned model. Example applications include a text messaging application, an email application, a dictation application, a virtual keyboard application, a browser application, etc.

Each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

The user computing system 2 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing system 10.

The central intelligence layer can communicate with a central device data layer. The central device data layer can be a centralized repository of data for the computing system. The central device data layer may communicate with a number of other components of the computing device, such as, for example, one or more sensors, a context manager, a device state component, and/or additional components. In some implementations, the central device data layer can communicate with each device component using an API (e.g., a private API).

Figure 5B:
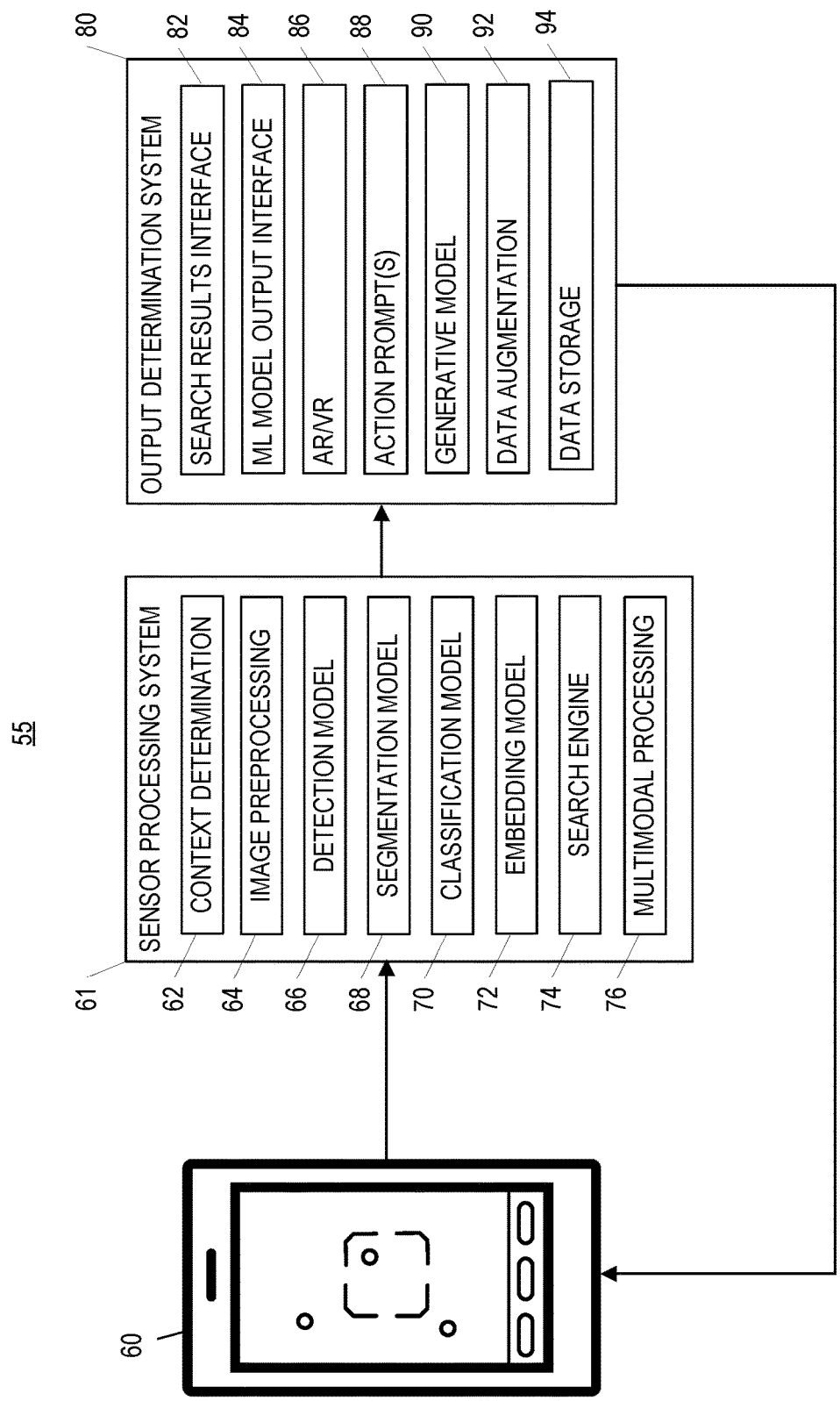
FIG. 5B is a block diagram depicting an example computing system that performs query refinement processing for image-based queries according to example embodiments of the present disclosure.

FIG. 5B is a block diagram depicting an example computing system that performs query refinement processing for image-based queries according to example embodiments of the present disclosure. In particular, the example computing system 50 can include one or more computing devices 60 that can be utilized to obtain, and/or generate, one or more datasets that can be processed by a sensor processing system 61 and/or an output determination system 80 to feedback to a user that can provide information on features in the one or more obtained datasets. The one or more datasets can include image data, text data, audio data, multimodal data, latent encoding data, etc. The one or more datasets may be obtained via one or more sensors associated with the one or more computing devices 60 (e.g., one or more sensors in the computing device 60). Additionally and/or alternatively, the one or more datasets can be stored data and/or retrieved data (e.g., data retrieved from a web resource). For example, images, text, and/or other content items may be interacted with by a user. The interacted with content items can then be utilized to generate one or more determinations.

The one or more computing devices 60 can obtain, and/or generate, one or more datasets based on image capture, sensor tracking, data storage retrieval, content download (e.g., downloading an image or other content item via the internet from a web resource), and/or via one or more other techniques. The one or more datasets can be processed with a sensor processing system 61. The sensor processing system 61 may perform one or more processing techniques using one or more machine-learned models, one or more search engines, and/or one or more other processing techniques. The one or more processing techniques can be performed in any combination and/or individually. The one or more processing techniques can be performed in series and/or in parallel. In particular, the one or more datasets can be processed with a context determination block 62, which may determine a context associated with one or more content items. The context determination block 62 may identify and/or process metadata, user profile data (e.g., preferences, user search history, user browsing history, user purchase history, and/or user input data), previous interaction data, global trend data, location data, time data, and/or other data to determine a particular context associated with the user. The context can be associated with an event, a determined trend, a particular action, a particular type of data, a particular environment, and/or another context associated with the user and/or the retrieved or obtained data.

The sensor processing system 61 may include an image preprocessing block 64. The image preprocessing block 64 may be utilized to adjust one or more values of an obtained and/or received image to prepare the image to be processed by one or more machine-learned models and/or one or more search engines 74. The image preprocessing block 64 may resize the image, adjust saturation values, adjust resolution, strip and/or add metadata, and/or perform one or more other operations.

In some implementations, the sensor processing system 61 can include one or more machine-learned models, which may include a detection model 66, a segmentation model 68, a classification model 70, an embedding model 72, and/or one or more other machine-learned models. For example, the sensor processing system 61 may include one or more detection models 66 that can be utilized to detect particular features in the processed dataset. In particular, one or more images can be processed with the one or more detection models 66 to generate one or more bounding boxes associated with detected features in the one or more images.

Additionally and/or alternatively, one or more segmentation models 68 can be utilized to segment one or more portions of the dataset from the one or more datasets. For example, the one or more segmentation models 68 may utilize one or more segmentation masks (e.g., one or more segmentation masks manually generated and/or generated based on the one or more bounding boxes) to segment a portion of an image, a portion of an audio file, and/or a portion of text. The segmentation may include isolating one or more detected objects and/or removing one or more detected objects from an image.

The one or more classification models 70 can be utilized to process image data, text data, audio data, latent encoding data, multimodal data, and/or other data to generate one or more classifications. The one or more classification models 70 can include one or more image classification models, one or more object classification models, one or more text classification models, one or more audio classification models, and/or one or more other classification models. The one or more classification models 70 can process data to determine one or more classifications.

In some implementations, data may be processed with one or more embedding models 72 to generate one or more embeddings. For example, one or more images can be processed with the one or more embedding models 72 to generate one or more image embeddings in an embedding space. The one or more image embeddings may be associated with one or more image features of the one or more images. In some implementations, the one or more embedding models 72 may be configured to process multimodal data to generate multimodal embeddings. The one or more embeddings can be utilized for classification, search, and/or learning embedding space distributions.

The sensor processing system 61 may include one or more search engines 74 that can be utilized to perform one or more searches. The one or more search engines 74 may crawl one or more databases (e.g., one or more local databases, one or more global databases, one or more private databases, one or more public databases, one or more specialized databases, and/or one or more general databases) to determine one or more search results. The one or more search engines 74 may perform feature matching, text based search, embedding based search (e.g., k-nearest neighbor search), metadata based search, multimodal search, web resource search, image search, text search, and/or application search.

Additionally and/or alternatively, the sensor processing system 61 may include one or more multimodal processing blocks 76, which can be utilized to aid in the processing of multimodal data. The one or more multimodal processing blocks 76 may include generating a multimodal query and/or a multimodal embedding to be processed by one or more machine-learned models and/or one or more search engines 74.

The output(s) of the sensor processing system 61 can then be processed with an output determination system 80 to determine one or more outputs to provide to a user. The output determination system 80 may include heuristic based determinations, machine-learned model based determinations, user selection based determinations, and/or context based determinations.

The output determination system 80 may determine how and/or where to provide the one or more search results in a search results interface 82. Additionally and/or alternatively, the output determination system 80 may determine how and/or where to provide the one or more machine-learned model outputs in a machine-learned model output interface 84. In some implementations, the one or more search results and/or the one or more machine-learned model outputs may be provided for display via one or more user interface elements. The one or more user interface elements may be overlayed over displayed data. For example, one or more detection indicators may be overlayed over detected objects in a viewfinder. The one or more user interface elements may be selectable to perform one or more additional searches and/or one or more additional machine-learned model processes. In some implementations, the user interface elements may be provided as specialized user interface elements for specific applications and/or may be provided uniformly across different applications. The one or more user interface elements can include pop-up displays, interface overlays, interface tiles and/or chips, carousel interfaces, audio feedback, animations, interactive widgets, and/or other user interface elements.

Additionally and/or alternatively, data associated with the output(s) of the sensor processing system 61 may be utilized to generate and/or provide an augmented-reality experience and/or a virtual-reality experience 86. For example, the one or more obtained datasets may be processed to generate one or more augmented-reality rendering assets and/or one or more virtual-reality rendering assets, which can then be utilized to provide an augmented-reality experience and/or a virtual-reality experience 86 to a user. The augmented-reality experience may render information associated with an environment into the respective environment. Alternatively and/or additionally, objects related to the processed dataset(s) may be rendered into the user environment and/or a virtual environment. Rendering dataset generation may include training one or more neural radiance field models to learn a three-dimensional representation for one or more objects.

In some implementations, one or more action prompts 88 may be determined based on the output(s) of the sensor processing system 61. For example, a search prompt, a purchase prompt, a generate prompt, a reservation prompt, a call prompt, a redirect prompt, and/or one or more other prompts may be determined to be associated with the output(s) of the sensor processing system 61. The one or more action prompts 88 may then be provided to the user via one or more selectable user interface elements. In response to a selection of the one or more selectable user interface elements, a respective action of the respective action prompt may be performed (e.g., a search may be performed, a purchase application programming interface may be utilized, and/or another application may be opened).

In some implementations, the one or more datasets and/or the output(s) of the sensor processing system 61 may be processed with one or more generative models 90 to generate a model-generated content item that can then be provided to a user. The generation may be prompted based on a user selection and/or may be automatically performed (e.g., automatically performed based on one or more conditions, which may be associated with a threshold amount of search results not being identified).

The output determination system 80 may process the one or more datasets and/or the output(s) of the sensor processing system 61 with a data augmentation block 92 to generate augmented data. For example, one or more images can be processed with the data augmentation block 92 to generate one or more augmented images. The data augmentation can include data correction, data cropping, the removal of one or more features, the addition of one or more features, a resolution adjustment, a lighting adjustment, a saturation adjustment, and/or other augmentation.

In some implementations, the one or more datasets and/or the output(s) of the sensor processing system 61 may be stored based on a data storage block 94 determination.

The output(s) of the output determination system 80 can then be provided to a user via one or more output components of the user computing device 60. For example, one or more user interface elements associated with the one or more outputs can be provided for display via a visual display of the user computing device 60.

The processes may be performed iteratively and/or continuously. One or more user inputs to the provided user interface elements may condition and/or affect successive processing loops.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of", "any combination of" example elements listed therein, etc. Terms such as "based on" should be understood as "based at least in part on."

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

What is claimed is:

1. A computer-implemented method, comprising:
    obtaining, by one or more processors, image data describing an image captured with a first computing device;
    generating, by one or more processors using at least one optical character recognition process, a text fragment from at least a portion of the image;
    generating, by one or more processors with a first machine-learned model, at least one predicted system task based at least in part on the text fragment;
    obtaining, by one or more processors, search results for a first query executed based at least in part on the text fragment;
    determining, by one or more processors, that the at least one predicted system task is not fulfilled by the search results for the first query;
    in response to determining that the at least one predicted system task is not fulfilled by the search results for the first query, generating, by one or more processors with a second machine-learned model, at least one query refinement based at least in part on an association between the text fragment and one or more completed user queries;
    providing, by the one or more processors, a second query based on the at least one query refinement to a search or assistant platform and obtaining search results for the second query; and
    generating, by one or more processors, data for a search results page based at least in part on the at least one query refinement.

2. The computer-implemented method of claim 1, wherein the search results page includes:
    the search results for the first query; and
    a user interface element corresponding to the at least one query refinement.

3. The computer-implemented method of claim 1, wherein the search results page includes:
    search results for the at least one query refinement; and
    a user interface element corresponding to the first query.

4. The computer-implemented method of claim 1, wherein generating, by one or more processors, the at least one query refinement comprises:
    generating the at least one query refinement based at least in part on comparing the text fragment with the one or more completed user queries.

5. The computer-implemented method of claim 1, further comprising:
    detecting, by one or more processors, at least one error in the text fragment based at least in part on error probability data; and
    generating, by one or more processors, a modified text fragment based at least in part on the at least one error in the text fragment;
    wherein generating, by one or more processors, at least one query refinement is based at least in part on an association between the modified text fragment and the one or more completed user queries.

6. The computer-implemented method of claim 5, wherein obtaining, by one or more processors, search results for the first query executed based at least in part on the text fragment contained in the image comprises:
    obtaining search results for the first query executed based at least in part on the modified text fragment.

7. The computer-implemented method of claim 1, wherein detecting, by one or more processors, at least one error in the text fragment comprises:
    determining a static error probability of recognized characters using a static error probability table.

8. The computer-implemented method of claim 1, wherein detecting, by one or more processors, at least one error in the text fragment comprises:
    determining a dynamic error probability of recognized characters at runtime of the optical character recognition process.

9. The computer-implemented method of claim 1, wherein:
    said generating, by one or more processors using at least one optical character recognition process, the text fragment from at least a portion of the image is performed by at least a first processor at a client computing system; and
    said generating, by one or more processors, at least one query refinement based at least in part on an association between the text fragment contained in the image and one or more completed user queries is performed by at least a second processor at a server computing system.

10. The computer-implemented method of claim 1, further comprising:
    determining, by one or more processors, at least one predicted system task associated with a second query;
    obtaining, by one or more processors, search results for the second query;

determining, by one or more processors, that the search results for the second query fulfill the at least one predicted system task associated with the second query; and in response to the search results for the second query fulfilling the at least one predicted system task associated with the second query, generating, by one or more processors, display data for a search results page, the search results page including at least a portion of the search results for the second query.

11. The computer-implemented method of claim 1, wherein generating, by one or more processors, the at least one query refinement comprises:

providing the text fragment as an input to a machine-learned query completion model trained to generate completed queries based at least in part on text fragments.

12. The computer-implemented method of claim 1, wherein determining, by one or more processors, the at least one predicted system task based at least in part on the text fragment comprises:

determining the at least one predicted system task based at least in part on the text fragment and at least one other input, the at least one other input including at least one of an image input or an audio input.

13. A computing system, comprising:

one or more processors; and one or more non-transitory computer-readable media that collectively store instructions that, when executed by the one or more processors, cause the one or more processors to perform operations, comprising:

obtaining image data describing an image captured with a first computing device;

generating, using at least one optical character recognition process, a text fragment from at least a portion of the image;

generating, with a first machine-learned model, at least one predicted system task based at least in part on the text fragment;

obtaining search results for a first query executed based at least in part on the text fragment;

determining that the at least one predicted system task is not fulfilled by the search results for the first query;

in response to determining that the at least one predicted system task is not fulfilled by the search results for the first query, generating, with a second machine-learned model, at least one query refinement based at least in part on an association between the text fragment and one or more completed user queries;

providing a second query based on the at least one query refinement to a search or assistant platform and obtaining search results for the second query; and generating display data for a search results page based at least in part on the at least one query refinement.

14. The computing system of claim 13, wherein the operations further comprise:

detecting at least one error in the text fragment based at least in part on error probability data; and generating a modified text fragment based at least in part on the at least one error in the text fragment;

wherein generating at least one query refinement is based at least in part on an association between the modified text fragment and the one or more completed user queries.

15. The computing system of claim 14, wherein obtaining search results for the first query executed based at least in part on the text fragment contained in the image comprises:

obtaining search results for the first query executed based at least in part on the modified text fragment.

16. The computing system of claim 13, wherein:

said generating, using at least one optical character recognition process, a text fragment from at least a portion of the image is performed by at least a first processor at a client computing system; and said generating at least one query refinement based at least in part on an association between the text fragment contained in the image and one or more completed user queries is performed by at least a second processor at a server computing system.

17. The computing system of claim 13, wherein the operations further comprise:

determining at least one predicted system task associated with a second query;

obtaining search results for the second query;

determining that the search results for the second query fulfill the at least one predicted system task associated with the second query; and in response to the search results for the second query fulfilling the at least one predicted system task associated with the second query, generating display data for a search results page, the search results page including at least a portion of the search results for the second query.

18. One or more non-transitory computer-readable storage media that store instructions that, when executed by one or more processors, cause the one or more processors to perform operations, the operations comprising:

obtaining image data describing an image captured with a first computing device;

generating, using at least one optical character recognition process, a text fragment from at least a portion of the image;

generating, with a first machine-learned model, at least one predicted system task based at least in part on the text fragment;

obtaining search results for a first query executed based at least in part on the text fragment;

determining that the at least one predicted system task is not fulfilled by the search results for the first query;

in response to determining that the at least one predicted system task is not fulfilled by the search results for the first query, generating, with a second machine-learned model, at least one query refinement based at least in part on an association between the text fragment and one or more completed user queries;

providing a second query based on the at least one query refinement to a search or assistant platform and obtaining search results for the second query; and generating display data for a search results page based at least in part on the at least one query refinement.

19. The one or more non-transitory computer-readable storage media of claim 18, wherein the operations further comprise:

detecting at least one error in the text fragment based at least in part on error probability data; and generating a modified text fragment based at least in part on the at least one error in the text fragment;

wherein generating at least one query refinement is based at least in part on an association between the modified text fragment and the one or more completed user queries.

20. The one or more non-transitory computer-readable storage media of claim 18, wherein the operations further comprise:

determining at least one predicted system task associated with a second query;
obtaining search results for the second query;
determining that the search results for the second query fulfill the at least one predicted system task associated with the second query; and
in response to the search results for the second query fulfilling the at least one predicted system task associated with the second query, generating display data for a search results page, the search results page including at least a portion of the search results for the second query.

* * * * *